United States Patent
Fadell et al.

(10) Patent No.: US 9,092,040 B2
(45) Date of Patent: Jul. 28, 2015

(54) HVAC FILTER MONITORING

(75) Inventors: Anthony Michael Fadell, Portola Valley, CA (US); Yoky Matsuoka, Los Altos Hills, CA (US); Matthew Lee Rogers, Los Gatos, CA (US); David Sloo, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 301 days.

(21) Appl. No.: 12/987,257

(22) Filed: Jan. 10, 2011

(65) Prior Publication Data

US 2012/0125592 A1 May 24, 2012

Related U.S. Application Data

(60) Provisional application No. 61/415,771, filed on Nov. 19, 2010, provisional application No. 61/429,093, filed on Dec. 31, 2010.

(51) Int. Cl.
*F24F 11/00* (2006.01)
*F24F 13/28* (2006.01)
(Continued)

(52) U.S. Cl.
CPC ............ *G05D 23/1917* (2013.01); *F24D 19/10* (2013.01); *F24D 19/1084* (2013.01); *F24F 11/0012* (2013.01); *G05D 23/19* (2013.01); *G05D 23/1902* (2013.01); *F24F 2011/0068* (2013.01); *F24F 2011/0073* (2013.01); *Y10T 29/49826* (2013.01)

(58) Field of Classification Search
CPC .................... G05B 23/02; F24F 2011/0093
USPC ........................................................ 702/185
See application file for complete search history.

(56) References Cited

U.S. PATENT DOCUMENTS

| | | | |
|---|---|---|---|
| 1,639,299 A | 8/1927 | Kinnard | |
| 2,492,774 A | 12/1937 | Howlett | |

(Continued)

FOREIGN PATENT DOCUMENTS

| | | |
|---|---|---|
| CA | 2202008 C | 2/2000 |
| DE | 19609390 A1 | 9/1997 |

(Continued)

OTHER PUBLICATIONS

Honeywell CT2700, An Electronic Round Programmable Thermostat—User's Guide, Honeywell, Inc., 1997, 8 pages.
(Continued)

*Primary Examiner* — Manuel L Barbee
(74) *Attorney, Agent, or Firm* — Kilpatrick Townsend & Stockton LLP

(57) ABSTRACT

A method is described for identifying faults relating to an HVAC system, such a clogged filter. Sensor data is used to estimate HVAC system efficiency. Trends in system efficiency are then used to identify faults such as clogged filters. The sensor(s) can include one or more of the following types: optical sensor, temperature sensor, pressure sensor, acoustic transducer, humidity sensor, resistive sensor, capacitive sensor, and infrared sensor. The efficiency estimation can also be based on conditions external to the building, such as data from exterior sensors and/or data gathered from third parties such as government or private weather stations. The efficiency estimation can also be based on performance metrics such as the time used to reach a set point temperature. The fault identification includes filtering out non-fault related events.

20 Claims, 6 Drawing Sheets

(51) Int. Cl.
*G05D 23/19* (2006.01)
*F24D 19/10* (2006.01)

(56) References Cited

U.S. PATENT DOCUMENTS

| | | | |
|---|---|---|---|
| 3,025,484 A | 12/1949 | Wild |
| 4,223,831 A | 9/1980 | Szarka |
| 4,316,577 A | 2/1982 | Adams et al. |
| 4,335,847 A | 6/1982 | Levine |
| 4,408,711 A | 10/1983 | Levine |
| 4,615,380 A | 10/1986 | Beckey |
| 4,646,964 A | 3/1987 | Parker et al. |
| 4,656,835 A | 4/1987 | Kidder et al. |
| 4,657,179 A | 4/1987 | Aggers et al. |
| 4,674,027 A | 6/1987 | Beckey |
| 4,685,614 A | 8/1987 | Levine |
| 4,742,475 A | 5/1988 | Kaiser et al. |
| 4,751,961 A | 6/1988 | Levine et al. |
| 4,768,706 A | 9/1988 | Parfitt |
| 4,897,798 A | 1/1990 | Cler |
| 4,948,040 A | 8/1990 | Kobayashi et al. |
| 5,005,365 A | 4/1991 | Lynch |
| 5,088,645 A | 2/1992 | Bell |
| 5,211,332 A | 5/1993 | Adams |
| 5,240,178 A | 8/1993 | Dewolf et al. |
| 5,244,146 A * | 9/1993 | Jefferson et al. ............... 236/11 |
| 5,294,047 A | 3/1994 | Schwer et al. |
| 5,348,078 A | 9/1994 | Dushane et al. |
| 5,381,950 A | 1/1995 | Aldridge |
| 5,395,042 A | 3/1995 | Riley et al. |
| 5,415,346 A | 5/1995 | Bishop |
| 5,476,221 A | 12/1995 | Seymour |
| 5,482,209 A | 1/1996 | Cochran et al. |
| 5,485,954 A | 1/1996 | Guy et al. |
| 5,499,196 A | 3/1996 | Pacheco |
| 5,533,668 A | 7/1996 | Erikson |
| 5,544,036 A | 8/1996 | Brown, Jr. et al. |
| 5,555,927 A | 9/1996 | Shah |
| 5,595,342 A | 1/1997 | McNair et al. |
| 5,603,451 A | 2/1997 | Helander et al. |
| 5,611,484 A | 3/1997 | Uhrich |
| 5,627,531 A | 5/1997 | Posso et al. |
| 5,635,896 A | 6/1997 | Tinsley et al. |
| 5,644,173 A | 7/1997 | Elliason et al. |
| 5,673,850 A | 10/1997 | Uptegraph |
| 5,761,083 A | 6/1998 | Brown, Jr. et al. |
| 5,802,467 A | 9/1998 | Salazar et al. |
| 5,808,602 A | 9/1998 | Sellers |
| 5,839,654 A | 11/1998 | Weber |
| 5,902,183 A | 5/1999 | D'Souza |
| 5,909,378 A | 6/1999 | De Milleville |
| 5,926,776 A | 7/1999 | Glorioso et al. |
| 5,931,378 A | 8/1999 | Schramm |
| 5,977,964 A | 11/1999 | Williams et al. |
| 6,032,867 A | 3/2000 | Dushane et al. |
| 6,062,482 A | 5/2000 | Gauthier et al. |
| 6,095,427 A * | 8/2000 | Hoium et al. ............... 236/49.3 |
| 6,098,893 A | 8/2000 | Berglund et al. |
| 6,116,512 A | 9/2000 | Dushane et al. |
| D435,473 S | 12/2000 | Eckel et al. |
| 6,164,374 A | 12/2000 | Rhodes et al. |
| 6,196,468 B1 | 3/2001 | Young |
| 6,206,295 B1 | 3/2001 | LaCoste |
| 6,207,899 B1 | 3/2001 | Gillespie |
| 6,213,404 B1 | 4/2001 | Dushane et al. |
| 6,216,956 B1 | 4/2001 | Ehlers et al. |
| 6,286,764 B1 | 9/2001 | Garvey et al. |
| 6,298,285 B1 | 10/2001 | Addink et al. |
| 6,347,747 B1 | 2/2002 | Nesbitt |
| 6,349,883 B1 | 2/2002 | Simmons et al. |
| 6,356,204 B1 | 3/2002 | Guindi et al. |
| 6,385,510 B1 | 5/2002 | Hoog et al. |
| 6,453,687 B2 | 9/2002 | Sharood et al. |
| 6,478,233 B1 | 11/2002 | Shah |
| 6,502,758 B2 | 1/2003 | Cottrell |
| D471,825 S | 3/2003 | Peabody |
| 6,574,581 B1 | 6/2003 | Bohrer et al. |
| 6,604,023 B1 | 8/2003 | Brown et al. |
| 6,619,055 B1 | 9/2003 | Addy |
| 6,619,555 B2 | 9/2003 | Rosen |
| 6,622,115 B1 | 9/2003 | Brown et al. |
| 6,622,925 B2 | 9/2003 | Carner et al. |
| 6,644,557 B1 | 11/2003 | Jacobs |
| 6,645,066 B2 | 11/2003 | Gutta et al. |
| 6,769,482 B2 | 8/2004 | Wagner et al. |
| 6,798,341 B1 | 9/2004 | Eckel et al. |
| D503,631 S | 4/2005 | Peabody |
| 6,951,306 B2 | 10/2005 | DeLuca |
| 6,975,958 B2 | 12/2005 | Bohrer et al. |
| 6,983,889 B2 | 1/2006 | Alles |
| 6,990,821 B2 * | 1/2006 | Singh et al. ............... 62/129 |
| 6,997,390 B2 | 2/2006 | Alles |
| 7,000,849 B2 | 2/2006 | Ashworth et al. |
| 7,024,336 B2 | 4/2006 | Salsbury et al. |
| 7,083,109 B2 | 8/2006 | Pouchak |
| 7,114,554 B2 | 10/2006 | Bergman et al. |
| 7,135,965 B2 | 11/2006 | Chapman, Jr. et al. |
| 7,141,748 B2 | 11/2006 | Tanaka et al. |
| 7,156,316 B2 | 1/2007 | Kates |
| 7,159,790 B2 | 1/2007 | Schwendinger et al. |
| 7,168,627 B2 | 1/2007 | Kates |
| 7,188,482 B2 * | 3/2007 | Sadegh et al. ............... 62/126 |
| 7,258,280 B2 | 8/2007 | Wolfson |
| 7,264,175 B2 | 9/2007 | Schwendinger et al. |
| 7,287,709 B2 | 10/2007 | Proffitt et al. |
| 7,289,887 B2 | 10/2007 | Rodgers |
| 7,299,996 B2 | 11/2007 | Garrett et al. |
| 7,333,880 B2 | 2/2008 | Brewster et al. |
| D566,587 S | 4/2008 | Rosen |
| 7,360,370 B2 | 4/2008 | Shah et al. |
| 7,379,791 B2 * | 5/2008 | Tamarkin et al. ............. 700/286 |
| RE40,437 E | 7/2008 | Rosen |
| 7,451,937 B2 | 11/2008 | Flood et al. |
| 7,455,240 B2 | 11/2008 | Chapman, Jr. et al. |
| 7,469,550 B2 | 12/2008 | Chapman, Jr. et al. |
| 7,509,753 B2 | 3/2009 | Nicosia et al. |
| 7,537,171 B2 | 5/2009 | Mueller et al. |
| 7,555,364 B2 | 6/2009 | Poth et al. |
| 7,558,648 B2 | 7/2009 | Hoglund et al. |
| 7,575,179 B2 | 8/2009 | Morrow et al. |
| 7,584,899 B2 | 9/2009 | de Pauw et al. |
| 7,600,694 B2 | 10/2009 | Helt et al. |
| 7,605,714 B2 | 10/2009 | Thompson et al. |
| D603,277 S | 11/2009 | Clausen et al. |
| 7,623,028 B2 * | 11/2009 | Kates ............... 340/521 |
| 7,624,931 B2 | 12/2009 | Chapman, Jr. et al. |
| 7,634,504 B2 | 12/2009 | Amundson |
| 7,641,126 B2 | 1/2010 | Schultz et al. |
| 7,644,869 B2 | 1/2010 | Hoglund et al. |
| 7,693,582 B2 | 4/2010 | Bergman et al. |
| 7,702,424 B2 | 4/2010 | Cannon et al. |
| D614,976 S | 5/2010 | Skafdrup et al. |
| 7,726,581 B2 | 6/2010 | Naujok et al. |
| 7,784,704 B2 | 8/2010 | Harter |
| 7,802,618 B2 | 9/2010 | Simon et al. |
| 7,832,465 B2 | 11/2010 | Zou et al. |
| 7,837,128 B2 | 11/2010 | Helt et al. |
| 7,845,576 B2 | 12/2010 | Siddaramanna et al. |
| 7,847,681 B2 | 12/2010 | Singhal et al. |
| 7,848,900 B2 | 12/2010 | Steinberg et al. |
| 7,854,389 B2 | 12/2010 | Ahmed |
| 7,904,209 B2 | 3/2011 | Podgorny et al. |
| 7,904,830 B2 | 3/2011 | Hoglund et al. |
| 8,010,237 B2 | 8/2011 | Cheung et al. |
| 8,019,567 B2 | 9/2011 | Steinberg et al. |
| D651,529 S | 1/2012 | Mongell et al. |
| 8,090,477 B1 | 1/2012 | Steinberg |
| 8,131,497 B2 | 3/2012 | Steinberg et al. |
| 8,180,492 B2 | 5/2012 | Steinberg |
| 8,195,313 B1 | 6/2012 | Fadell et al. |
| 8,219,249 B2 * | 7/2012 | Harrod et al. ............... 700/276 |
| 8,280,536 B1 | 10/2012 | Fadell et al. |
| 8,415,829 B2 * | 4/2013 | Di Cristofaro ............... 307/39 |
| 8,442,695 B2 | 5/2013 | Imes et al. |

(56) References Cited

U.S. PATENT DOCUMENTS

| | | |
|---|---|---|
| 8,442,752 B2 * | 5/2013 | Wijaya et al. ............... 701/123 |
| 2002/0005435 A1 | 1/2002 | Cottrell |
| 2003/0112262 A1 | 6/2003 | Adatia et al. |
| 2004/0034484 A1 | 2/2004 | Solomita, Jr. et al. |
| 2004/0249479 A1 | 12/2004 | Shorrock |
| 2004/0256472 A1 * | 12/2004 | DeLuca ............. 236/46 R |
| 2005/0043907 A1 | 2/2005 | Eckel et al. |
| 2005/0119793 A1 | 6/2005 | Amundson et al. |
| 2005/0128067 A1 | 6/2005 | Zakrewski |
| 2005/0159847 A1 | 7/2005 | Shah et al. |
| 2005/0189429 A1 | 9/2005 | Breeden |
| 2005/0192915 A1 | 9/2005 | Ahmed et al. |
| 2005/0194455 A1 | 9/2005 | Alles |
| 2005/0194456 A1 | 9/2005 | Tessier et al. |
| 2005/0204997 A1 | 9/2005 | Fournier |
| 2005/0270151 A1 | 12/2005 | Winick |
| 2005/0280421 A1 | 12/2005 | Yomoda et al. |
| 2006/0105697 A1 | 5/2006 | Aronstam et al. |
| 2006/0149395 A1 | 7/2006 | Archacki et al. |
| 2006/0186214 A1 | 8/2006 | Simon et al. |
| 2006/0196953 A1 | 9/2006 | Simon et al. |
| 2006/0208099 A1 | 9/2006 | Chapman et al. |
| 2007/0001830 A1 | 1/2007 | Dagci et al. |
| 2007/0045430 A1 | 3/2007 | Chapman et al. |
| 2007/0045433 A1 | 3/2007 | Chapman et al. |
| 2007/0045444 A1 | 3/2007 | Gray et al. |
| 2007/0050732 A1 | 3/2007 | Chapman et al. |
| 2007/0114295 A1 | 5/2007 | Jenkins |
| 2007/0115902 A1 | 5/2007 | Shamoon et al. |
| 2007/0131787 A1 | 6/2007 | Rossi et al. |
| 2007/0158442 A1 | 7/2007 | Chapman et al. |
| 2007/0173978 A1 | 7/2007 | Fein et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2007/0266575 A1 * | 11/2007 | Nash ................ 33/355 R |
| 2008/0015740 A1 | 1/2008 | Osann |
| 2008/0015742 A1 | 1/2008 | Kulyk et al. |
| 2008/0054082 A1 | 3/2008 | Evans et al. |
| 2008/0128523 A1 | 6/2008 | Hoglund et al. |
| 2008/0151458 A1 | 6/2008 | Beland et al. |
| 2008/0161977 A1 | 7/2008 | Takach et al. |
| 2008/0185450 A1 | 8/2008 | Kwon et al. |
| 2008/0191045 A1 | 8/2008 | Harter |
| 2008/0238660 A1 | 10/2008 | Dayton et al. |
| 2008/0245480 A1 | 10/2008 | Knight et al. |
| 2008/0273754 A1 | 11/2008 | Hick et al. |
| 2008/0290183 A1 | 11/2008 | Laberge et al. |
| 2008/0317292 A1 | 12/2008 | Baker et al. |
| 2009/0001180 A1 | 1/2009 | Siddaramanna et al. |
| 2009/0045263 A1 | 2/2009 | Mueller et al. |
| 2009/0065595 A1 | 3/2009 | Kates |
| 2009/0140056 A1 | 6/2009 | Leen |
| 2009/0143916 A1 | 6/2009 | Boll et al. |
| 2009/0171862 A1 | 7/2009 | Harrod et al. |
| 2009/0236433 A1 | 9/2009 | Mueller et al. |
| 2009/0243842 A1 | 10/2009 | Mitchell et al. |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0283603 A1 | 11/2009 | Peterson et al. |
| 2009/0297901 A1 | 12/2009 | Kilian et al. |
| 2009/0312968 A1 | 12/2009 | Phillips |
| 2010/0000239 A1 | 1/2010 | Lifson et al. |
| 2010/0006660 A1 | 1/2010 | Leen et al. |
| 2010/0012737 A1 | 1/2010 | Kates |
| 2010/0019051 A1 | 1/2010 | Rosen |
| 2010/0025483 A1 | 2/2010 | Hoeynck et al. |
| 2010/0070084 A1 | 3/2010 | Steinberg et al. |
| 2010/0070086 A1 | 3/2010 | Harrod et al. |
| 2010/0070234 A1 | 3/2010 | Steinberg et al. |
| 2010/0084482 A1 | 4/2010 | Kennedy et al. |
| 2010/0167783 A1 | 7/2010 | Alameh et al. |
| 2010/0168924 A1 | 7/2010 | Tessier et al. |
| 2010/0198425 A1 | 8/2010 | Donovan |
| 2010/0211224 A1 | 8/2010 | Keeling et al. |
| 2010/0250009 A1 | 9/2010 | Lifson et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0305771 A1 | 12/2010 | Rodgers |
| 2010/0308119 A1 | 12/2010 | Steinberg et al. |
| 2010/0318227 A1 | 12/2010 | Steinberg et al. |
| 2011/0015798 A1 | 1/2011 | Golden et al. |
| 2011/0015802 A1 | 1/2011 | Imes |
| 2011/0046792 A1 | 2/2011 | Imes et al. |
| 2011/0046805 A1 | 2/2011 | Bedros et al. |
| 2011/0046806 A1 * | 2/2011 | Nagel et al. ............. 700/291 |
| 2011/0054699 A1 | 3/2011 | Imes et al. |
| 2011/0077896 A1 | 3/2011 | Steinberg et al. |
| 2011/0166712 A1 | 7/2011 | Kramer et al. |
| 2011/0185895 A1 | 8/2011 | Freen |
| 2011/0253796 A1 | 10/2011 | Posa et al. |
| 2011/0307103 A1 | 12/2011 | Cheung et al. |
| 2012/0024969 A1 | 2/2012 | Kates |
| 2012/0031984 A1 | 2/2012 | Feldmeier et al. |
| 2012/0065935 A1 | 3/2012 | Steinberg et al. |
| 2012/0085831 A1 | 4/2012 | Kopp |
| 2012/0158350 A1 | 6/2012 | Steinberg et al. |
| 2012/0221151 A1 | 8/2012 | Steinberg |
| 2013/0073506 A1 | 3/2013 | Camp et al. |

FOREIGN PATENT DOCUMENTS

| | | |
|---|---|---|
| EP | 434926 A2 | 7/1991 |
| EP | 196069 B1 | 12/1991 |
| EP | 720077 A2 | 7/1996 |
| EP | 802471 A2 | 10/1997 |
| EP | 1065079 A2 | 1/2001 |
| EP | 1275037 B1 | 2/2006 |
| EP | 1731984 A1 | 12/2006 |
| EP | 2157492 A2 | 2/2010 |
| GB | 2212317 B | 5/1992 |
| JP | 59106311 A | 6/1984 |
| JP | 01252850 A | 10/1989 |
| JP | 10023565 A | 1/1998 |
| JP | 2002087050 A | 3/2002 |
| JP | 2003054290 A | 2/2003 |
| NL | 1024986 C2 | 7/2005 |
| WO | 0248851 A2 | 6/2002 |
| WO | 2009073496 A2 | 7/2009 |
| WO | 2011128416 A2 | 10/2011 |

OTHER PUBLICATIONS

Honeywell CT8775A,C, The digital Round Non-Programmable Thermostats—Owner's Guide, Honeywell International Inc., 2003, 20 pages.

Honeywell T8700C, An Electronic Round Programmable Thermostat—Owner's Guide, Honeywell, Inc., 1997, 12 pages.

Honeywell T8775 The Digital Round Thermostat, Honeywell, 2003, 2 pages.

Honeywell T8775AC Digital Round Thermostat Manual No. 69-1679EF-1, www.honeywell.com/yourhome, Jun. 2004, pp. 1-16.

The Clever Thermostat User Manual and Installation Guide, ICY BV ICY3815 Timer-Thermostat, 2009, pp. 1-36.

TP-PAC, TP-PHP, TP-NAC, TP-NHP Performance Series AC/HP Thermostat Installation Instructions, Carrier Corp, 2007, 56 pages.

U.S. Appl. No. 60/512,886, Volkswagen Rotary Knob for Motor Vehicle—English Translation of German Application filed Oct. 20, 2003.

Arens et al., "Demand Response Electrical Appliance Manager—User Interface Design, Development and Testing", Poster, Demand Response Enabling Technology Development, University of California Berkeley, Retrieved from dr.berkeley.edu/dream/posters/2005_6GUIposter.pdf, 2005, 1 page.

Arens et al., "Demand Response Enabled Thermostat—Control Strategies and Interface", Demand Response Enabling Technology

(56) References Cited

OTHER PUBLICATIONS

Development Poster, University of California Berkeley, Retrieved from dr.berkeley.edu/dream/posters/2004_11CEC_TstatPoster.pdf, 2004, 1 page.
Auslander et al., "UC Berkeley DR Research Energy Management Group", Power Point Presentation, DR ETD Workshop, State of California Energy Commission, Jun. 11, 2007, pp. 1-35.
Chen et al., "Demand Response-Enabled Residential Thermostat Controls", Abstract, ACEEE Summer Study on Energy Efficiency in Buildings, Mechanical Engineering Dept. and Architecture Dept., University of California Berkeley., 2008, pp. 1-24 through 1-36.
Green, "Thermo Heat Tech Cool", Popular Mechanics Electronic Thermostat Guide, Oct. 1985, pp. 155-158.
Meier et al., "Thermostat Interface Usability: A Survey", Ernest Orlando Lawrence Berkeley National Laboratory, Environmental Energy Technologies Division, Berkeley California, Sep. 2010, pp. 1-73.
Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley., 2008, pp. 7-242 through 7-253.
Peffer et al., "Smart Comfort At Home: Design of a Residential Thermostat to Achieve Thermal Comfort, and Save Money and Peak Energy", University of California Berkeley, Mar. 2007, 1 page.
Wright et al., "DR ETD—Summary of New Thermostat, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.
Aprilaire Electronic Thermostats Model 8355 User's Manual, Research Products Corporation, 2000, 16 pages.
Braeburn 5300 Installer Guide, Braeburn Systems, LLC, 2009, 10 pages.
Braeburn Model 5200, Braeburn Systems, LLC, 2011, 11 pages.
Ecobee Smart Si Thermostat Installation Manual, Ecobee, 2012, 40 pages.
Ecobee Smart Si Thermostat User Manual, Ecobee, 2012, 44 pages.
Ecobee Smart Thermostat Installation Manual, 2011, 20 pages.
Ecobee Smart Thermostat User Manual, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., 2012, 24 pages.
Honeywell Operating Manual FocusPRO TH6000 Series, Honeywell International, Inc., 2011, 80 pages.
Honeywell Prestige IAQ Product Data 2, Honeywell International, Inc., 2012, 126 pages.
Honeywell Prestige THX9321-9421 Operating Manual, Honeywell International, Inc., 2011, 120 pages.
Hunter Internet Thermostat Installation Guide, Hunter Fan Co., 2012, 8 pages.
Lennox ComfortSense 5000 Owners Guide, Lennox Industries, Inc., 2007, 32 pages.
Lennox ComfortSense 7000 Owners Guide, Lennox Industries, Inc., 2009, 15 pages.
Lennox iComfort Manual, Lennox Industries, Inc., 2010, 20 pages.
Lux PSPU732T Manual, LUX Products Corporation, No Date Given, 48 pages.
NetX RP32-WIFI Network Thermostat Specification Sheet, Network Thermostat, 2012, 2 pages.
RobertShaw Product Manual 9620, Maple Chase Company, 2001, 14 pages.
RobertShaw Product Manual 9825i2, Maple Chase Company, 2006, 36 pages.
SYSTXCCUIZ01-V Infinity Control Installation Instructions, Carrier Corp, 2012, 20 pages.
T8611G Chronotherm IV Deluxe Programmable Heat Pump Thermostat Product Data, Honeywell International Inc., 1997, 24 pages.
TB-PAC, TB-PHP, Base Series Programmable Thermostats, Carrier Corp, 2012, 8 pages.
The Perfect Climate Comfort Center PC8900A W8900A-C Product Data Sheet, Honeywell International Inc, 2001, 44 pages.
Trane Communicating Thermostats for Fan Coil, Trane, 2011, 32 pages.
Trane Communicating Thermostats for Heat Pump Control, Trane, 2011, 32 pages.
Trane Install XL600 Installation Manual, Trane, 2006, 16 pages.
Trane XL950 Installation Guide, Trane, 2011, 20 pages.
Venstar T2900 Manual, Venstar, Inc., 2008, 113 pages.
VisionPRO TH8000 Series Installation Guide, Honeywell International, Inc., 2012, 12 pages.
VisionPRO TH8000 Series Operating Manual, Honeywell International, Inc., 2012, 96 pages.
VisionPRO Wi-Fi Programmable Thermostat, Honeywell International, Inc Operating Manual, 2012, 48 pages.
Allen et al., "Real-Time Earthquake Detection and Hazard Assessment by ElarmS Across California", Geophysical Research Letters, vol. 36, L00B08, 2009, pp. 1-6.
Arens et al., "Demand Response Enabling Technology Development", Phase I Report: Jun. 2003-Nov. 2005, Jul. 27, P:/DemandRes/ UC Papers/DR-Phase1Report-Final DraftApril24-26.doc, University of California Berkeley, pp. 1-108.
Arens et al., "New Thermostat Demand Response Enabling Technology", Poster, University of California Berkeley, Jun. 10, 2004.
Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Loisos et al., "Buildings End-Use Energy Efficiency: Alternatives to Compressor Cooling", California Energy Commission, Public Interest Energy Research, Jan. 2000, 80 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Mozer, "The Neural Network House: An Environmental that Adapts to it's Inhabitants", AAAI Technical Report SS-98-02, 1998, pp. 110-114.
Energy Joule, retrieved from the Internet: <http://web.archive.org/web/20110723210421/http://www.ambientdevices.com/products/energyjoule.html> [retrieved on Aug. 1, 2012], Ambient Devices, Jul. 23, 2011, 3 pages.
Honeywell Prestige THX9321 and TXH9421 Product Data, Honeywell International, Inc., 68-0311, Jan. 2012, 126 pages.
ICY 3815TT-001 Timer-Thermostat Package Box, ICY BV Product Bar Code No. 8717953007902, 2009, 2 pages.
Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.
NetX RP32-WIFI Network Thermostat Consumer Brochure, Network Thermostat, May 2011, 2 pages.
The Clever Thermostat, ICY BV Web Page, http://www.icy.nl/en/consumer/products/clever-thermostat, ICY BV, 2012, 1 page.
Salus, S-Series Digital Thermostat Instruction Manual-ST620 Model No. Instruction Manual, Version 005, www.salus-tech.com, Apr. 29, 2010, 24 pages.
Sanford, iPod (Click Wheel) (2004), retrieved from the Internet: <URL: http://apple-history.com/ipod> [retrieved on Apr. 9, 2012], Apple Inc., 2012, 2 pages.
Venstar T5800 Manual, Venstar, Inc., Sep. 7, 2011, 63 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.

* cited by examiner

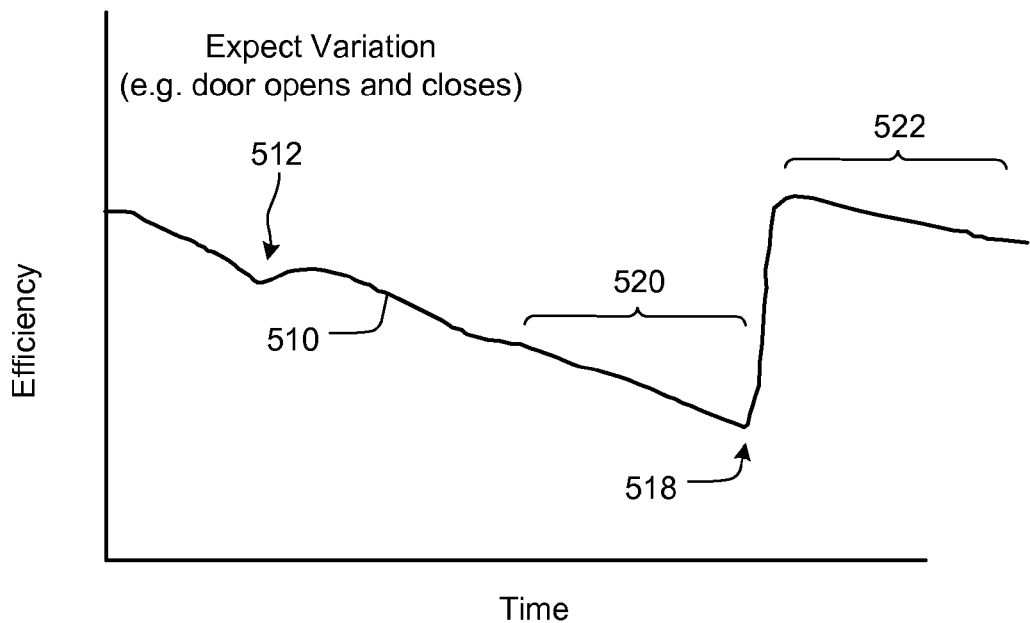

HVAC FILTER MONITORING

COPYRIGHT AUTHORIZATION

A portion of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention generally relates to filters in HVAC systems. More particularly, embodiments of this invention relate to techniques for estimating filter status, estimating HVAC characteristics, and sensors relating to filters in HVAC systems.

Many HVAC systems utilize a filter for cleaning the air, which is heated or cooled by the HVAC system. In the case of residential and/or light industrial buildings, these filters require cleaning or replacement, usually by the occupants, after a period of use. A dirty filter restricts airflow through the HVAC unit, which inhibits the HVAC system's ability to force air through the ductwork and interchange the air in the building. Often, replacement of the filter is neglected by the user, and the performance of the system consequentially degrades. When the performance of the system degrades, not only dues the system become less effective in terms of the time needed to raise or lower the temperature—leading to less comfort for the occupants, the degraded performance can also be also a significant source of wasted energy resources and money. Thus, it is desirable to have an indication of HVAC filter status, and in particular an indication of when the HVAC filter is sufficiently clogged that it should be cleaned or replaced.

Various attempts have been discussed at determining HVAC filter status. For example, U.S. Patent Application Publication No. 2007/0228183 discusses the determination of a clogged filter via airflow sensors located in various locations. A number of techniques rely on fan motor speed monitoring. For example, U.S. Patent Application Publication No. 2007/0234746 discusses comparing a historical calculated airflow restriction with a current as a possible indicator of a clogged filter. The airflow restriction is calculated using a static pressure drop, which can be calculated as a function of delivered airflow, and from sensed fan motor speed. U.S. Pat. No. 6,003,414 discusses detecting a clogged filter using static pressure, which can be derived as a function of delivered air flow and sensing the fan motor speed. U.S. Pat. No. 7,261,762 discusses detecting a clogged filter based on system resistance determined using fan speed and power. Finally, U.S. Pat. No. 7,188,482 discusses detecting faults, including filter plugging, in a duct free heat pump system known as a multi-modular split system (MMS) by utilizing various sensors located within the heating system.

Another problem that sometimes arises is during installation and/or setup of a new thermostat, the HVAC system capacity may not be known by the installer or building occupant in the case of residential and/or light industrial buildings. Thus it is desirable to provide a technique of estimating HVAC system capacity from other available information.

SUMMARY

According to some embodiments a method for identifying conditions relating to an HVAC system fault, such a clogged filter, is provided. The method includes receiving sensor data representing readings from one or more sensors; estimating HVAC system performance based on the received sensor data; and identifying a condition relating to the HVAC system fault based on the estimated HVAC system performance. According to some embodiments, the HVAC system performance is HVAC system efficiency. The sensor(s) can include one or more of the following types: optical sensor, temperature sensor, pressure sensor, acoustic transducer, humidity sensor, resistive sensor, capacitive sensor, and infrared sensor.

According to some embodiments the efficiency estimation is based in part on conditions external to the building, such as data from exterior sensors and/or data gathered from third parties such as government or private weather stations. According to some embodiments, the efficiency estimation is based on performance metrics such as the time used to reach a set point temperature. According to some embodiments, the fault identification includes filtering out non-fault related events. According to some embodiments, the building in which the HVAC system is installed is used primarily for residential or light-industrial purposes. According to some embodiments the identified condition, and/or a cost associated with the condition is displayed to a user.

According to some embodiments, an air filter for use with an HVAC system is provided. The air filter includes a housing; filtering media adapted to remove unwanted material from air passing through the HVAC system; and a sensor. According to some embodiments the air filter is disposable. According to some embodiments, the sensor is positioned and is of a type such that an estimate of filter condition can be made based in part on the sensor.

According to some embodiments the filter also includes one or more of the following: a wireless communication device adapted to transmit data from the sensor to a receiver; a power harvester (e.g. using piezoelectric elements) positioned and adapted to generate power from air passing through the filter; and a power storage device adapted to store power generated by the power harvester. The sensor(s) can include one or more of the following types: optical sensor, temperature sensor, pressure sensor, acoustic transducer, humidity sensor, resistive sensor, capacitive sensor, and infrared sensor.

According to some embodiments, a method is provided for estimating HVAC system capacity. The method includes receiving input from a user representing characteristics of an air filter used in the HVAC system; and estimating HVAC system capacity based on the input received from the user. The characteristics of the air filter can include physical dimensions of the air filter, or the manufacturer's part number associated with the air filter. According to some embodiments, characteristics of the HVAC system are modeled based in part on the estimated HVAC system capacity.

As used herein the term "HVAC" includes systems providing both heating and cooling, heating only, cooling only, as well as systems that provide other occupant comfort and/or conditioning functionality such as humidification, dehumidification and ventilation.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIG. 5 is graph plotting HVAC efficiency versus time, according to some embodiments;

FIG. 6 is a flow chart showing steps in identifying system faults, according to some embodiments;

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
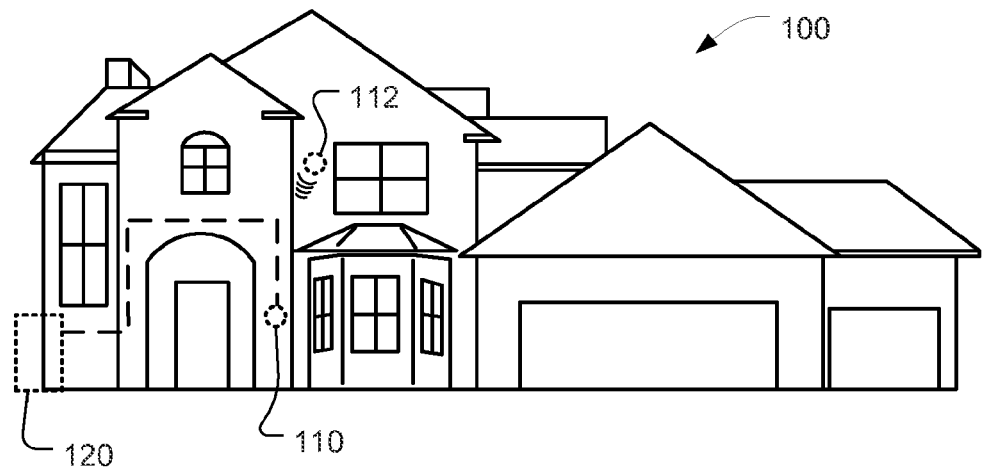
FIG. 1 is a diagram of an enclosure in which environmental conditions are controlled, according to some embodiments.

FIG. 1 is a diagram of an enclosure in which environmental conditions are controlled, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. According to some embodiments, the device 112 can be located outside of the enclosure 100.

Figure 2:
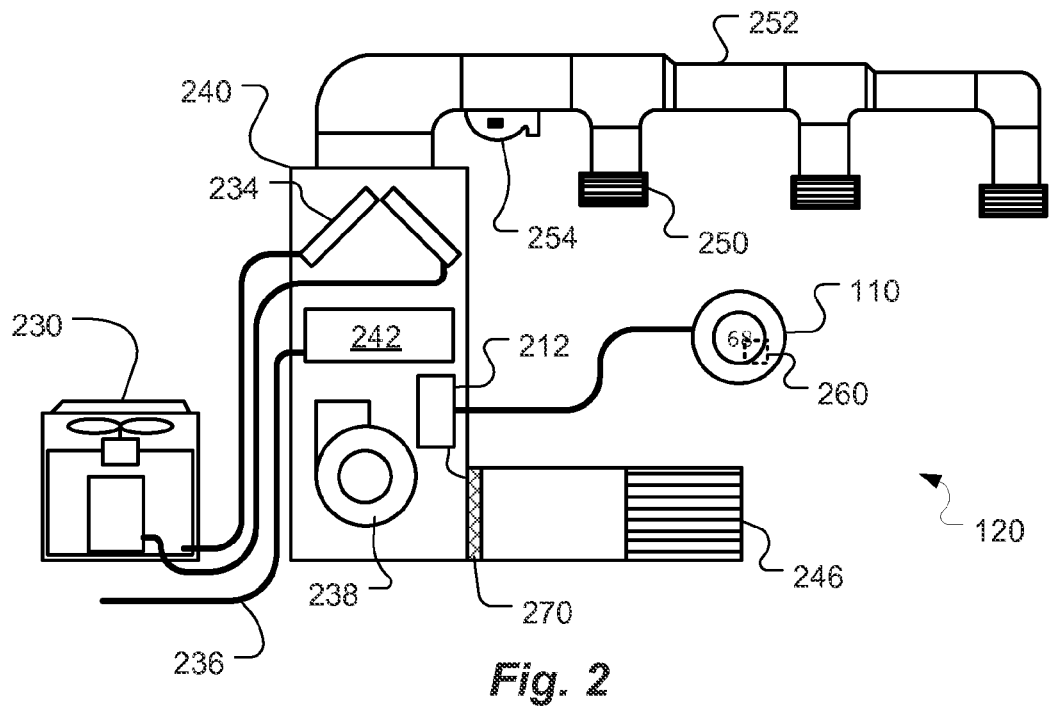
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270, using fan 238 and is heated heating coils or elements 242. The heated air flows back into the enclosure at one or more locations via supply air duct system 252 and supply air grills such as grill 250. In cooling an outside compressor 230 passes gas such a Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems. The system is controlled by algorithms implemented via control electronics 212 that communicate with a thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

Figure 3:
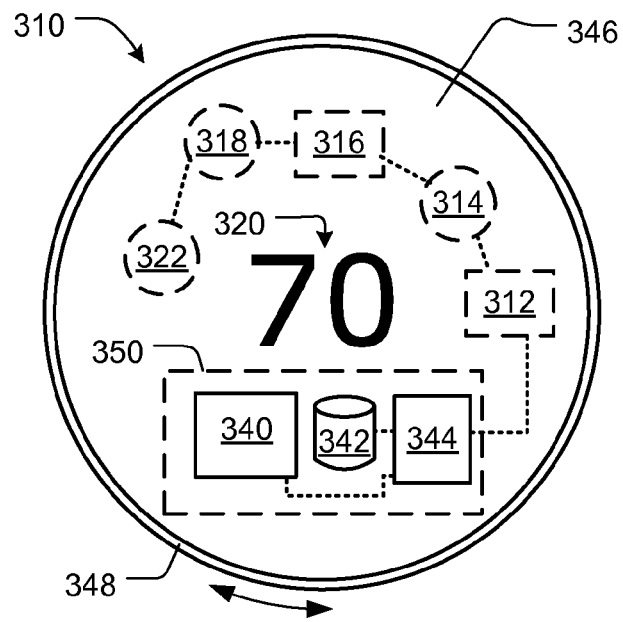
FIG. 3 is a schematic of controller having a processing system used to estimate HVAC system conditions, such as filter status, according to some embodiments.

FIG. 3 is a schematic of controller having a processing system used to estimate HVAC system conditions, such as filter status, according to some embodiments. According to some embodiments, controller 310 is circular shaped thermostat and has a large display area 346 which can display graphical and textual information to a user such as with large central numerals 320. User input can be received through touch screen, or with an outer rotating ring 348. A processing system 350 is used to perform much of the functionality described herein. Processing system 350 includes one or more central processing units 344, storage system 342, and a power supply system 340 that can include capability of using available HVAC system power in the form of common wire power if available or power harvesting from one or more control circuits, in the case controller 310 is a wall-mounted thermostat that is hard-wired to the HVAC system. According to some embodiments, power supply system 340 includes one or more disposable or rechargeable batteries. According to some embodiments, controller 310 includes one or more sensors such as temperature sensor 312, pressure sensor 314, humidity sensor 316, audio transducer 318 and/or infrared sensor 322. According to some embodiment, one or more other types of sensors are included that may be helpful in identifying system faults such as a particle sensor.

According to some embodiments, controller 310 is not a hard-wired thermostat, but rather is able to control HVAC functionality, interact with a user and make measurements from a remote location, such as a table-top, or non-hard-wired wall mount. In such cases the controller 310 communicates with another controller and/or with other HVAC system components via wireless connection a low power digital radio technology such as Wi-Fi, or a low-rate wireless personal area network protocol such as ZigBee. According to some embodiments, controller 310 is equipped to communicate with other controllers or HVAC system components while located outside of the building, such as using mobile phone network capability or via Internet connection.

Figure 4:
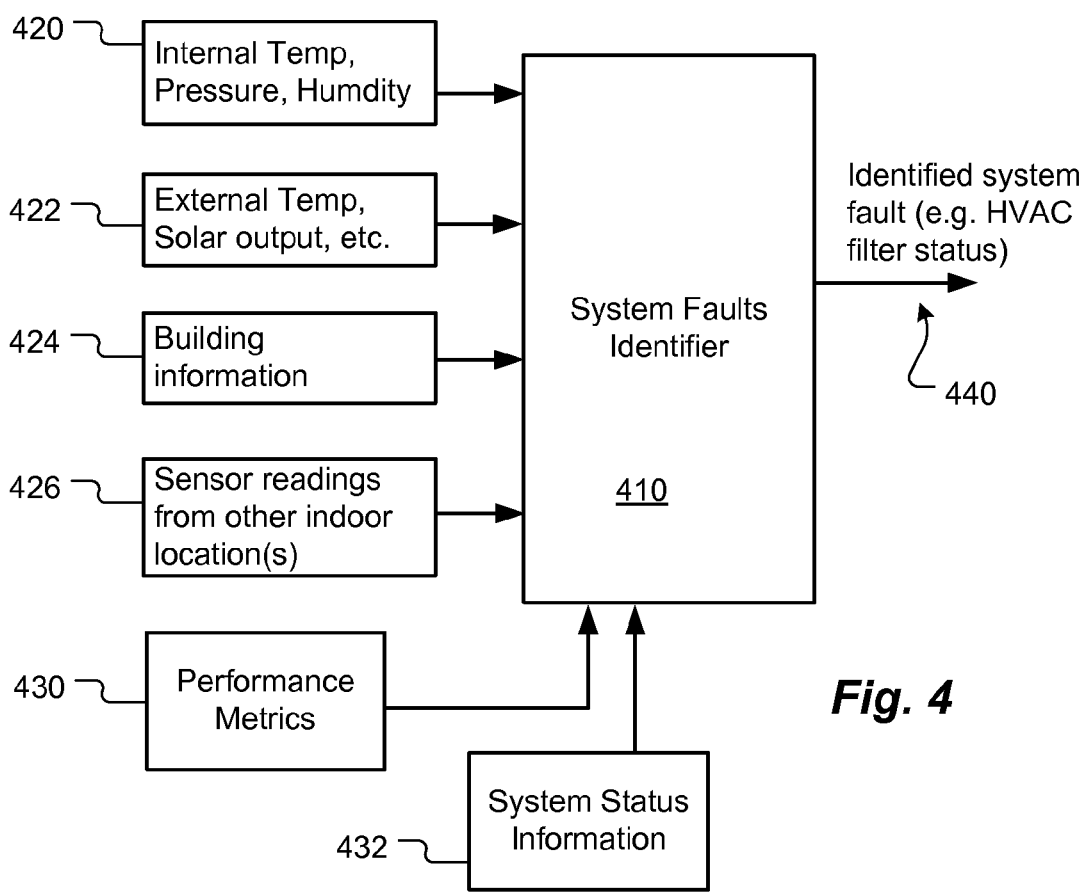
FIG. 4 is a block diagram illustrating a system for identifying system faults, such as filter status based on changes or trends in system efficiency, according to some embodiments.

FIG. 4 is a block diagram illustrating a system for identifying system faults, such as filter status based on changes or trends in system efficiency, according to some embodiments. System faults identifier 410 is preferably used to model the system behavior based on various inputs and output identified system faults 440, such as HVAC filter status information. System faults identifier is preferably carried out in a processing system such as processing system 350 as shown and described with respect to FIG. 3. According to some embodiments, the identifier makes use of a system identification module such as shown and described in co-pending U.S. patent application Ser. No. 12/881,463 entitled "Thermodynamic Modeling for Enclosures," filed on Sep. 14, 2010 (hereinafter "the '463 application"), and which is incorporated by reference herein. According to some embodiments, the system faults identifier 410 relies on temperature measurements 420 made within the controller/thermostat in order to identify a clogged filter status. According to this simple example, the system faults identifier 410 uses temperature measurements 420 and system status information, such as during which time the various HVAC functions (e.g. heating and cooling) are in the "on" and "off" states. The identifier 410 determines trends in HVAC efficiency and compares this with historical trends in order to identify a likely status such as a clogged HVAC filter. In particular, a clogged filter can generally be identified by a relatively slow and steady decline in HVAC efficiency. Other events that can significantly effect HVAC efficiency, such as opening and/or closing doors and windows, duct work failures, etc. are likely to result in a more rapid, less steady, decrease (or increase) in HVAC efficiency.

According to some embodiments, the inputs 420 from sensors located within the thermostat or controller used by identifier 410 also include static pressure and/or humidity. Measuring static pressure can be used, in combination with other measurements, for example, to estimate air flow through certain regions of the system. According to some embodiments, other examples of sensor data that can be used by identifier 410 include an optical sensors, a microphones or other acoustic transducers, infrared sensors, resistivity/conductivity sensor, and particulate sensor.

According to some embodiments, inputs 422 to identifier 410 include information regarding conditions outside the building, or outside the region of space in which the environment is being controlled by the HVAC system. For example, inputs 422 can include measurements from a temperature sensor mounted on the outside of the building which is being conditioned by the HVAC system. In general, however the outside weather condition information 422 can come for one or more sources. According to some embodiments, the external conditions input 422 includes weather conditions such as temperature, humidity, dew point, solar output, precipitation, wind and natural disasters. The external condition information can be measured with sensors in, on or around the building and/or obtained from third party sources such as government agencies, private source and/or nearby private weather stations.

According to some embodiments, identifier 410 also relies on building information 424. The building information 424 can come from various sources, such as building plans, which can be entered manually for example at the time of installation or at other times. According to some embodiments, building information can come from online sources such as online real estate databases or other databases or online services that collect publically available information.

According to some embodiments, identifier 410 also relies on sensor readings 426 from other indoor locations. Examples of indoor sensors not located in the controller/thermostat includes sensors located in other HVAC system components, such as one or more sensors located in the HVAC filter, as will be described in greater detail below. For example, an optical sensor on the filter itself can be used by identifier 410. According to some embodiments, measurements of fan speed (such as by measuring voltage and/or current associated with the HVAC fan (such as fan 238 as shown in FIG. 2). The fan speed can be used as an indication of air restriction due to filter clogging status. Another example of sensors in other locations are readings from sensors located in remote or non hard-wired locations, such as described with respect to FIG. 3. For example, there may be one hard-wired thermostat and one or more additional non-hard wired thermostats and communicate with the hard-wired thermostat wirelessly. By having sensor readings such as temperature or static pressure, in two or more locations, the temperature gradient, and/or airflow (based on spatial pressure differential) can be estimated.

According to some embodiments the other sensor readings 426 used by identifier 410 can include information from other household system such as a home security system that may have information as to the opening and closing of doors and/or windows.

According to some embodiments, performance metrics 430 are calculated and input to identifier 410. Example of performance metrics that are useful in calculating HVAC efficiency includes the time to reach a set point temperature, and the amount of HVAC operation time is used in maintaining a given temperature given certain outdoor conditions (e.g. from external conditions 422). In general the performance metrics 430 are based on the amount of energy input or used to produce certain results (i.e. system performance). For further details regarding time to reach, or maintain, set point or target temperature, see co-pending U.S. patent application Ser. No. 12/984,602 entitled "Temperature Controller With Time To Target Display" filed on Jan. 4, 2011, which is hereby incorporated by reference herein.

According to some embodiments, examples of other outputs 440 from identifier 410 include other filter status information (e.g. high level of pollen in filter), and/or other faults such as ducting problems and/or coolant recharge requirements.

FIG. 5 is graph plotting HVAC efficiency versus time, according to some embodiments. Curve 510 is calculated by the identifier 410 shown in FIG. 4 based on one or more of the inputs as described. As can be seen in this example, there is a steady trend in decreasing HVAC efficiency over time. There are two regions during the time period shown in which there is a noticeable increase in HVAC efficiency, namely at event 512 and at event 518. The increase at event 512 is due to an event such as a significant change in position of adjustable shutter dampers on air diffusers, or the position of certain doors and/or windows. For example, a door or window that used be left open which caused a decrease in HVAC efficiency is kept closed at event 512, thus resulting in a measurable increase in HVAC efficiency. According to some embodiments the door and/or window status is known from information gathered, such as from a home security system. However, according to some embodiments, the magnitude of the increase in efficiency indicates to the identifier that this is not an event that is related to the status of the HVAC. However at event 518, there is a significant increase in the HVAC efficiency. Additionally, the trend slope in the region 520 just before the event 518 is very similar to the trend slope of the region 522 just following the event 518 indicates that event 518 has a high likelihood of being related to HVAC filtering, and in particular is likely to represent a replacement of an old clogged filter with a new clean filter. Thus, in this way, slow changes over time can be tracked as an indication of inefficiency caused by the filter condition. This is in contrast to some prior techniques that detect only more serious faults and clogs of the filter. As is discussed in further detail below with respect to FIG. 10A, according to some embodiments, the filter efficiency can be displayed textually and/or graphically to the user.

According to some embodiments, the system queries the user as to whether a door/window position is changed, or if a filter has been replaced, so that the system can learn the characteristics of different events. In this case the trained identifier can more accurately identify system faults.

FIG. 6 is a flow chart showing steps in identifying system faults, according to some embodiments. In step 610 the inputs as described with respect to FIG. 4 are received by the system faults identifier. In step 612 the HVAC efficiency is determined and recorded over time. According to some embodiments the modeling and system identification techniques described in the '463 application are used in determining the HVAC efficiency. In step 614 significant changes in HVAC efficiency are identified, such as events 512 and 518 in FIG. 5. In step 616, a filtering process is undertaken to remove unwanted events. As mentioned above, the filtering can be based in part on the magnitude of the change in efficiency, such that smaller events are removed. According to some embodiments, the filtering relies in part on the performance metrics as described in FIG. 4, in order to distinguish different types of events. In step 618, an identified condition is displayed to the user. For example, if it is determined that the filter is clogged, such as just in the region 520 of FIG. 5, a notification that the filter is clogged is displayed to the user. According to some embodiments, a new filter can automatically be ordered using an on-line ordering system, when a sufficiently clogged filter is determined. According to other embodiments, a service company can be notified if a likely fault or other condition is identified that will likely require a service call.

Figure 7:
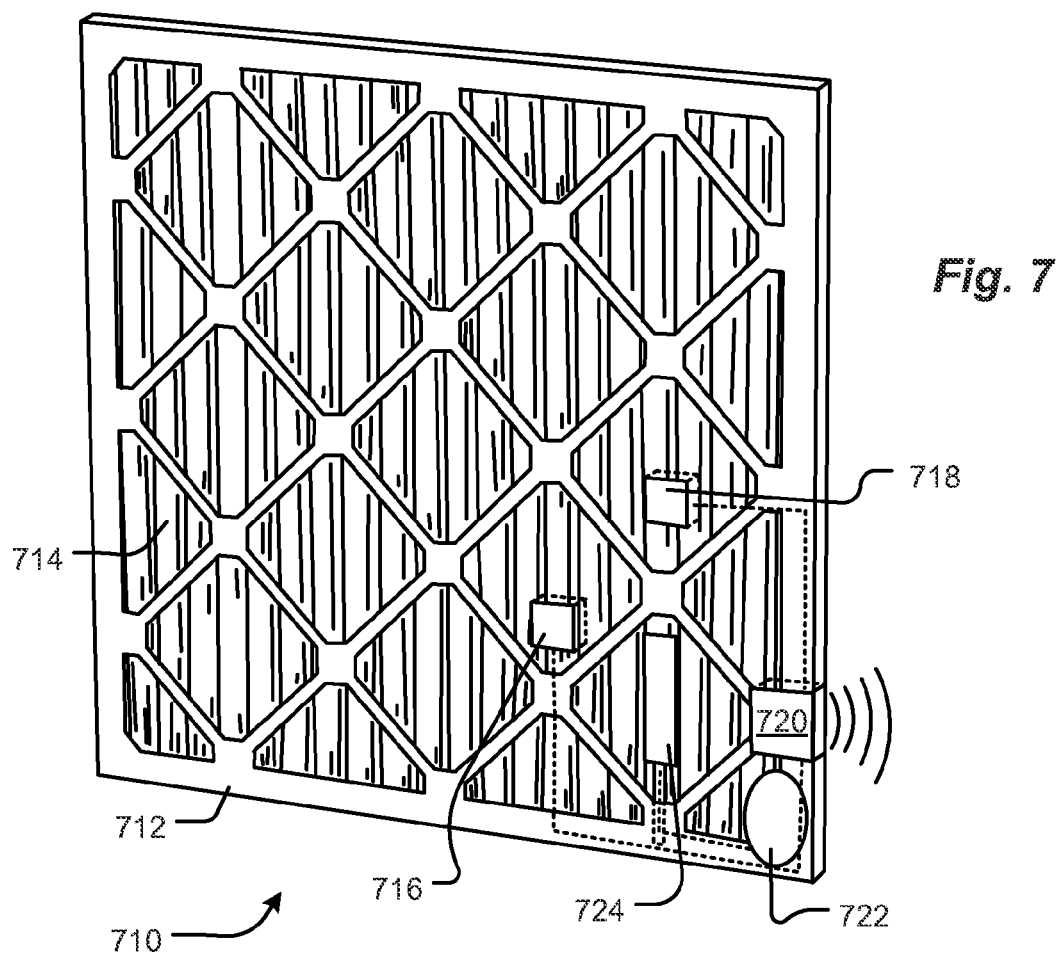
FIG. 7 illustrates an HVAC filter having one or more built in sensors, according to some embodiments.

FIG. 7 illustrates an HVAC filter having one or more built in sensors, according to some embodiments. Filter unit 710 is sized to fit as a standard replacement filter in an HVAC system. The filter unit 710 includes a rigid frame 712 to fit securely in the HVAC systems and one or more layers of v-shaped pleated filter media 714 to maximize air-flow and enhance particular capture. Two sensors 716 and 718 are provided to take a verity of readings according to various embodiments. The types of sensors include, but are not limited to: optical, infrared, temperature, pressure, microphone or other acoustic transducer, resistive and capacitive. According to some embodiments, more than one sensor of the same type can be included. For example, a pressure sensor can be mounted on both sides of the filter to detect pressure drop and allowing for a determination of air-flow. The sensors 716 and 718 are connected via one or more wires to a controller and communication unit 720. Unit 720 includes a processor, a memory, and a wireless communication system. According to some embodiments, a low power digital radio technology such as Wi-Fi, or a low-rate wireless personal area network protocol such as ZigBee is used. Power is generated from a piezo power harvesting element 724 which is mounted so as to be exposed to air-flow. The power is stored in a rechargeable battery 722. According to some embodiments, transmissions are only made when sufficient power is available. According to some embodiments, the components shown in FIG. 7 are supplied already installed in the filter unit 710, and the sensors and other components are low-cost and disposable (or recyclable) along with the filter unit. Although a pleated type filter is shown in FIG. 7, according to other embodiments, other types of HVAC filters can be equipped as shown in FIG. 7. For example, the filter 710 can be a ring panel/link panel design, a fiberglass filter, and/or an electrostatic filter.

According to some embodiments, sensor data from the sensor-equipped filter 710 is used to aid in detecting the status of the filters—such as clogging. For example, an optical sensor can be used to detect color or tone changes in the filtering media. According to another example, one or more pressure sensors can be used to determine air flow, thereby indicating filter condition. According to some embodiments, the sensors within filter 710 can be used for detecting other types of faults, such as ducting problems and/or coolant level problems.

According to the some embodiments, the sensor data from the sensor-equipped filter 710 is used for other purposes. For example, sensors on the filter 710 are located in close proximity to the furnace and/or air conditioner unit, so they can be used to indicate how much heating or cooling is being generated when those functions are active. This data can then be used, for example in a system identification module, such as described in the '463 application. According to some embodiments, a microphone or other acoustic transducer can be used to detect other types of HVAC faults.

Figure 8:
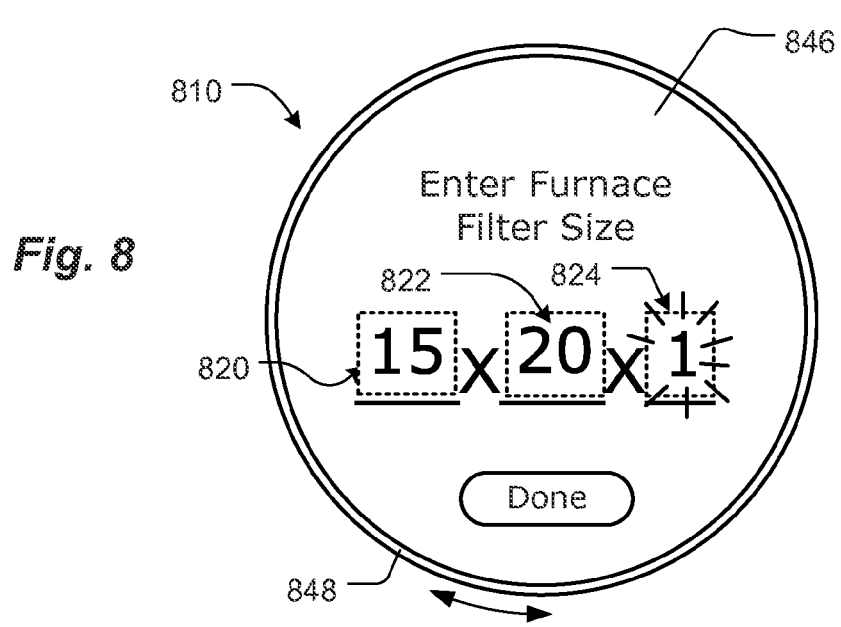
FIG. 8 illustrates a user interface in which the user enters an HVAC filter size, according to some embodiments.

FIG. 8 illustrates a user interface in which the user enters an HVAC filter size, according to some embodiments. Knowing the HVAC system heating and/or cooling capacity can be very useful for a number of applications. For example, for purposes of modeling of thermodynamic characteristics of a building having an HVAC system installed, the HVAC capacity is very useful. For further details of system identification and thermodynamic modeling for enclosures, see the '463 application. However, a typical user of a residential and/or light-industrial HVAC system may not know the HVAC capacity. If the user knows or can find out the HVAC filter size, the filter size can be used to estimate the capacity of the HVAC systems since there is in general a correlation between filter size and HVAC capacity. The controller 810 is of a type as described with respect to FIG. 3, having a outer rotating ring 848 and a large display area 846. The user is being asked to enter the HVAC filter size. The filter size is usually a combination of 3 dimensions. The size is entered by the user in the three fields 820, 822 and 824 using the rotating ring and/or a touch screen.

Figure 9:
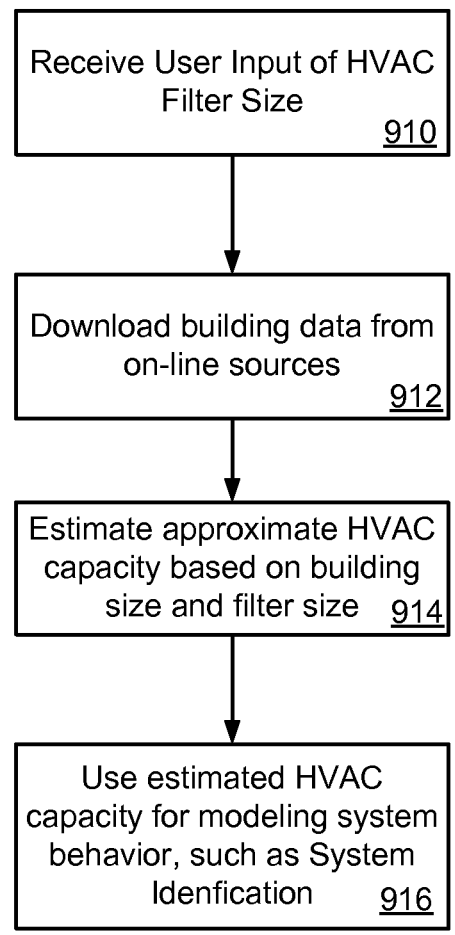
FIG. 9 is a flow chart illustrating step in estimating HVAC capacity using filter size, according to some embodiments.

FIG. 9 is a flow chart illustrating step in estimating HVAC capacity using filter size, according to some embodiments. In step 910, the user inputs the HVAC filter size using for example, an interface as shown in FIG. 8. In step 912, optionally, building data, such as number of rooms, square footage, number of floors, etc. is downloaded, for example from online sources such as online real estate databases or other databases or online services that collect publically available information. In step 914, the HVAC capacity if estimated based on the filter size and the building information. In step 916, the estimated HVAC capacity is used for modeling system behavior, such as is described in the '463 application.

Figure 10A:
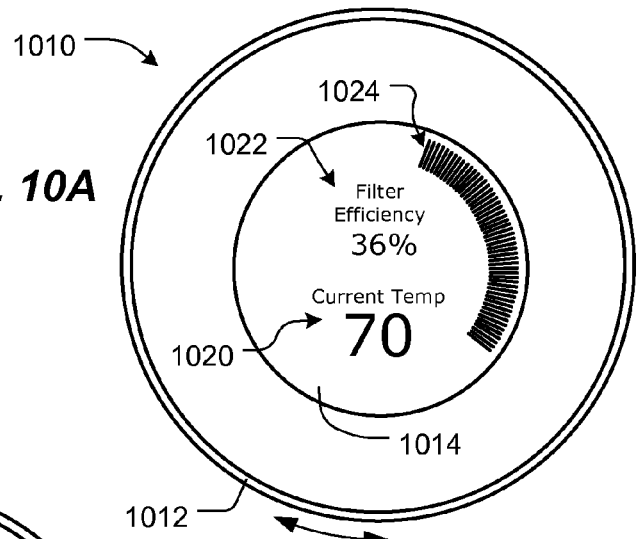
FIGS. 10A-10C illustrate a thermostat adapted to display information relating to HVAC filter efficiency, according to some embodiments.
Figure 10B:
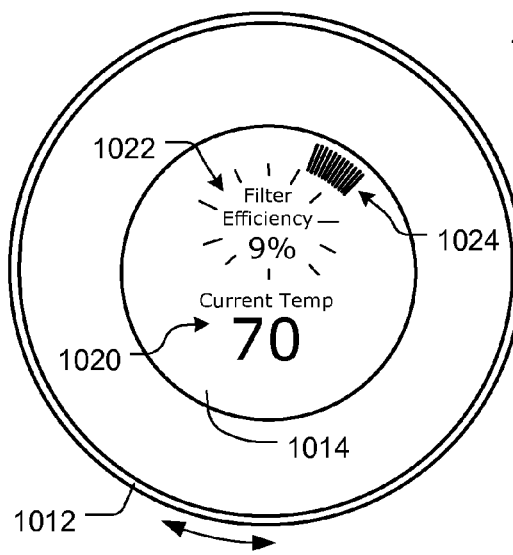
Figure 10C:
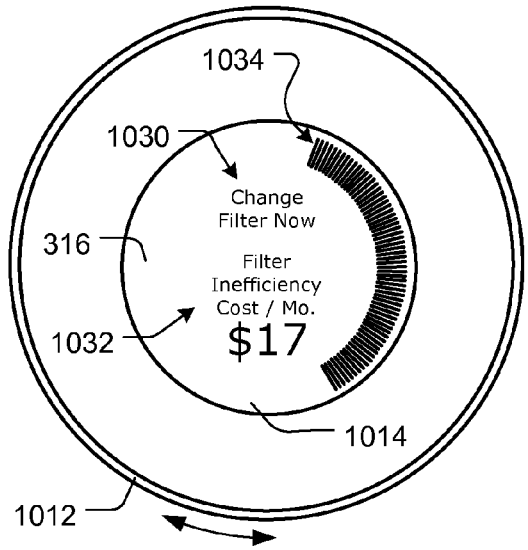

FIGS. 10A-10C illustrate a thermostat adapted to display information relating to HVAC filter efficiency, according to some embodiments. FIG. 10A shows a thermostat 1010 that is wall mounted and has circular in shape and has an outer rotatable ring 1012 for receiving user input. Thermostat 1010 has a large frontal display area 1014. According to some embodiments, thermostat 1010 is approximately 80 mm in diameter. The outer ring 1012 allows the user to make adjustments, such as selecting a new target temperature. For example by rotating the outer ring 1012 clockwise, the target temperature can be increased, and by rotating the outer ring 1014 counter-clockwise, the target temperature can be decreased. A selection can be made by pushing the front portion of the thermostat inward towards the wall. According to some embodiments, the large central numbers 1020 can be used to display the current temperature to users, as is shown in FIG. 10A. As described herein, the thermostat can track filter efficiency over time. The estimated filter efficiency is displayed in terms of a percentage in textual display 1022, in which 100% represents a brand new clean filter. According to some embodiments a graphical display of the filter efficiency can also be displayed as shown by bars 1024.

FIG. 10B shows a thermostat 1010 when the filter efficiency has dropped to 9% and the textual display 1022 is flashing to draw attention to the user of the condition. According to some embodiments, the filter efficiency is only displayed to the user when the user asks or when the filter efficiency drops below a certain threshold percentage.

FIG. 10C shows a thermostat 1010 displaying in textual form 1032 an estimated cost associated with the inefficiency. According to some embodiments the cost could be displayed in terms of additional energy used and or additional time required to reach a target temperature. According to some embodiments a graphical display 1034 is also used to indicate to the user the cost associated with the filter inefficiency. According to some embodiments, a textual warning 1030 can be used to notify the use the a filter change is recommended. According to some embodiments the textual and/or graphical information shown in FIGS. 10A-10C can be displayed to a user on a remote device, such as a personal computer or a smart phone.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A computer-implemented method, comprising:
    estimating a performance of an HVAC system, wherein estimating includes using data received from one or more sensors of the HVAC system;
    determining an efficiency of an air filter of the HVAC system using the estimated performance of the HVAC system, wherein the efficiency of the air filter is less than the efficiency of a new air filter;
    estimating a time to reach a setpoint temperature based on the efficiency of the air filter;
    estimating a cost associated with the efficiency of the air filter based on the time to reach the setpoint temperature;
    generating a visual icon for a display on an electronic display of a thermostat device, wherein the visual icon provides an indication of the estimated cost associated with the efficiency of the air filter; and
    displaying the visual icon on the electronic display of the thermostat device.

2. The method of claim 1, wherein the visual icon further provides an indication of whether the air filter needs to be changed.

3. The method of claim 1, wherein displaying the visual icon on the electronic display includes displaying a plurality of tick marks in a tick mark range area of the electronic display, wherein a number of tick marks displayed corresponds with the efficiency of the air filter, and wherein fewer tick marks indicate a lower air filter efficiency.

4. The method of claim 3, further comprising:
    displaying a numerical value associated with the efficiency of the air filter, wherein the numerical value displayed corresponds to the number of tick marks displayed.

5. The method of claim 4, wherein the numerical value is a percentage value of the air filter efficiency.

6. The method of claim 4, further comprising:
    performing an additional estimate of the performance of an HVAC system;
    determining that the efficiency of the air filter has decreased; and
    updating the display of the visual icon to display fewer tick marks and an updated numerical value that each correspond with the decrease in efficiency of the air filter.

7. The method of claim 1, further comprising:
    determining that the efficiency of the air filter is sufficiently low such that the air filter needs to be changed; and
    displaying an additional icon on the electronic display of the thermostat device to indicate that the air filter needs to be changed.

8. The method of claim 1, further comprising:
    displaying the visual icon on the electronic display in response to received input requesting the efficiency of the air filter, or in response to a determination that the efficiency of the air filter has dropped below a predetermined threshold.

9. The method of claim 1, wherein the one or more sensors include optical sensors, temperature sensors, pressure sensors, acoustic transducers, humidity sensors, resistive sensors, capacitive sensors, or infrared sensors.

10. The method of claim 1, wherein determining the efficiency of the air filter includes comparing an estimated trend of an efficiency of the HVAC system with historical trends of the efficiency of the HVAC system.

11. The method of claim 1, wherein the method is carried out in a thermostat device.

12. The method of claim 1, wherein estimating the performance of the HVAC system includes using conditions external to a building being conditioned by the HVAC system.

13. The method of claim 12, wherein the external conditions include data from one or more sensors located outside the building.

14. The method of claim 12, wherein the external conditions include data gathered from a government agency.

15. The method of claim 12, wherein the external conditions include data gathered from private weather stations.

16. The method of claim 1, wherein estimating the performance of the HVAC system includes using building information gathered from an external database representing characteristics of a building being conditioned by the HVAC system.

17. The method of claim 1, further comprising:

filtering out data that is not related to the efficiency of the air filter by determining that a magnitude of an increase in performance of the HVAC system is sufficiently small.

18. The method of claim 1, wherein at least one of the one or more sensors is located within the air filter of the HVAC system.

19. The method of claim 1, wherein the estimated cost includes an additional energy usage of the HVAC system.

20. The method of claim 1, wherein the estimated cost includes an additional time required to reach the setpoint temperature.

* * * * *